United States Patent [19]
Wilks et al.

[11] 3,922,383
[45] Nov. 25, 1975

[54] POLYMERIC LAMINATES

[75] Inventors: Alan D. Wilks, Mount Prospect; Karl J. Youtsey, Chicago, both of Ill.

[73] Assignee: Universal Oil Products Company, Des Plaines, Ill.

[22] Filed: Feb. 28, 1974

[21] Appl. No.: 446,889

[52] U.S. Cl. ............... 427/82; 252/506; 252/508; 443/448; 443/449; 427/126
[51] Int. Cl.² ............................................. B05D 5/12
[58] Field of Search ....... 117/201, 226, 228, 46 CG; 252/506, 508; 423/449, 448; 427/82, 126

[56] References Cited
UNITED STATES PATENTS

| 662,288 | 1/1969 | Boardman............... 117/201 X |
|---|---|---|
| 2,810,664 | 10/1957 | Gentnea..................... 117/226 |
| 2,880,120 | 3/1959 | Pelle ........................ 117/226 |
| 3,027,278 | 3/1962 | Reick..................... 117/226 |
| 3,172,774 | 3/1965 | Diefendorf.............. 117/226 |
| 3,211,937 | 10/1968 | Hester et al. ............ 117/226 X |
| 3,304,199 | 2/1967 | Faber, Sr. et al............ 117/201 |
| 3,399,969 | 9/1968 | Bokros et al............. 117/226 X |
| 3,582,445 | 1/1971 | Okuhashi.................. 117/227 X |
| 3,720,499 | 3/1973 | Hirayama et al. ........ 117/226 X |

*Primary Examiner*—Mayer Weinblatt
*Attorney, Agent, or Firm*—James R. Hoatson, Jr.; Raymond H. Nelson; William H. Page, II.

[57] ABSTRACT

Polymeric laminates either of the thermosetting or thermoplastic variety in which the surface layer or coating thereof contains a filler material which imparts certain desirable physical characteristics are prepared by adding a surface layer which contains a filler material in the final laminate curing step.

6 Claims, No Drawings

POLYMERIC LAMINATES

This invention relates to polymeric laminates and particularly to polymeric laminates in which the surface coating or layer thereof contains a filler material which provides certain desirable physical characteristics such as anti-static conductivity to the laminate.

Polymeric laminates, which are either thermosetting or thermoplastic in nature, may be prepared by curing and pressing predetermined thicknesses of these polymers or plastics in a manner known in the art. However, in some instances, it is desirable that the laminates possess certain desirable physical characteristics. For example, laminates which are prepared from epoxy resins or phenolic resins and contain a fibrous glass, woven fabric, matted fiber or paper filler may be used in printed circuit boards. It is therefore desirable that these laminates possess certain characteristics among which are anti-static conductivity properties. Likewise, thermosetting or thermoplastic polymers such as polyesters which are used to form boat, auto or truck bodies as well as being used in furniture or appliance components may, to their advantage, also possess anti-static conductivity properties. This anti-static conductivity property in the case of the polyesters may be used when applying a coating such as paint to the polyester. By possessing these anti-static conductivity or electrical conductivity properties, it is possible to subject the painting or coating material to an electrical charge and thereby have the droplets, especially when using a spraying device, be attracted to the surface of the plastic thereby reducing the amount of paint or coating which would ordinarily occur if the surface to be painted or coated were not of an electrically conductive material. As will be hereinafter shown in greater detail, it has now been discovered that polymeric materials and especially polymeric laminates may be prepared in which the surface of said finished laminate has been made electrically conductive by incorporating therein, as a filler material therefor, a semi-conducting pyropolymeric inorganic refractory oxide material.

It is therefore an object of this invention to provide a polymeric laminate in which the surface thereof has been treated to impart desirable physical characteristics thereto.

A further object of this invention is to provide a polymeric laminate containing, on the surface thereof, a filler material which provides electrically conductive properties to the laminate.

In one aspect an embodiment of this invention resides in a composition of matter comprising a polymeric core and a surface coating thereon, said surface coating containing a semi-conducting pyropolymeric inorganic refractory oxide material.

A specific embodiment of this invention is found is a composition of matter comprising a polymeric core consisting of an epoxy resin and a surface coating thereon, said surface coating containing a semi-conducting pyropolymeric inorganic refractory oxide material which possesses a resistivity in the range of from about 0.001 ohm-centimeters to about $10^{10}$ ohm-centimeters, said material being present in an amount in the range of from about 10% to about 50% by weight of the surface coating.

Other objects and embodiments will be found in the following further detailed description of the present invention.

As hereinbefore set forth the present invention is concerned with compositions of matter comprising polymeric substances such as polymeric laminates in which the surface coat or layer will possess certain filler materials which impart desired characteristics to the laminate. An example of a filler material which is contained in the surface coating or layer will comprise a semi-conducting pyropolymeric inorganic refractory oxide material. By utilizing this material in the surface coating, the polymeric substance will thus possess electrically conductive properties among which are anti-static properties. These anti-static properties are suitable in instances in which it is desirable to eliminate electrical charges which may be built up by friction such as in those instances where the polymeric materials are used in explosive environments such as fuel containers in airplanes, boats, automobiles, trucks, buses, etc., in fuel transfer pipe-lines such as those which are used to transport gasoline, oil, liquefied petroleum gas, heating gas, etc. or in medical operating room surfaces where oxygen and/or explosive vapors may be present thus enhancing the danger of sparking which may occur. In addition, the plastic laminate may also be used in instances where the electrical conductivity of the laminate will be such that it possesses an electrical resistance less than about 50,000 ohms. Therefore, the conducting layers or laminates of these polymeric materials may be included in wall paneling or ceiling paneling in building construction, for heating purposes or may also be used in exterior surfaces whereby de-icing of these surfaces could be accomplished in cold weather.

The semi-conducting pyropolymeric inorganic refractory oxide materials which are used to impart the desirable electrically conductive properties to the laminate will themselves possess electrical properties including a resistivity of a certain magnitude. The magnitude of the resistivity can be varied and may range from about 0.001 to about $10^{10}$ ohm-centimeters, the particular variation in resistivity being accomplished by varying the procedure in which the semi-conducting pyropolymeric inorganic refractory oxide material is prepared.

The semi-conducting pyropolymeric inorganic refractory oxide material may be prepared by heating an organic compound in the absence of oxygen and passing the pyrolyzable substance over the refractory oxide material in the vapor phase to form a carbonaceous pyropolymer thereon. The refractory oxide material which may be used as the base may be in any form such as loose or compacted dry powders, cast or calcined sols, heated sols, substrates in the form of flats, cylinders, spheres, rods, pellets, etc. In the preferred embodiment of the present invention the refractory oxide base will be characterized as having a surface area of from 1 to about 500 square meters per gram. Illustrative examples of the refractory oxides which may be used will include alumina in various forms such as gamma-alumina and silica-alumina. In addition, it is also contemplated that the refractory oxide may be preimpregnated with a catalytic metallic substance such as platinum, platinum and rhenium, platinum and germanium, platinum and tin, platinum and lead, nickel and rhenium, tin, lead, germanium, etc.

Examples of organic substances which may be pyrolyzed to form the pyropolymer on the surface of the aforementioned refractory oxides will include aliphatic hydrocarbons, cycloaliphatic hydrocarbons, aromatic hydrocarbons, aliphatic halogen derivatives, aliphatic oxygen derivatives, aliphatic sulfur derivatives, aliphatic nitrogen derivatives, heterocyclic compounds, organometallic compounds, carbohydrates, etc. Some specific examples of these organic compounds which may be pyrolyzed will include ethane, propane, butane, pentane, ethylene, propylene, 1-butene, 2-butene, 1-pentene, 2-pentene, 1,3-butadiene, isoprene, cyclopentane, cyclohexane, methylcyclopentane, benzene, toluene, the isomeric xylenes, naphthalene, anthracene, chloromethane, bromomethane, chloroethane, bromoethane, chloropropane, bromopropane, isopropane, chlorobutane, bromobutane, isobutane, carbon tetrachloride, chloroform, 1,2-dichloroethane, 1,2-dichloropropane, 1,2-dichlorobutane, ethyl alcohol, n-propyl alcohol, isopropyl alcohol, n-butyl alcohol, sec-butyl alcohol, t-butyl alcohol, glycol, glycerol, ethyl ether, isopropyl ether, butyl ether, ethyl mercaptan, n-propyl mercaptan, butyl mercaptan, methyl sulfide, ethyl sulfide, ethyl methyl sulfide, methyl propyl sulfide, dimethyl amine, diethyl amine, ethyl methyl amine, acetamide, propionamide, nitroethane, 1-nitropropane, 1-nitrobutane, acetonitrile, propionitrile, formic acid, acetic acid, oxalic acid, acrylic acid, formaldehyde, acid aldehyde, propionaldehyde, acetone, methyl ethyl ketone, methyl propyl ketone, ethyl propyl ketone, methyl formate, ethyl formate, ethyl acetate, benzyl chloride, phenol, o-cresol, benzyl alcohol, hydroquinone, resorcinol, catechol, anisole, phenetole, benzaldehyde, acetophenone, benzophenone, benzoquinone, benzoic acid, phenyl acetate acid, hydrocinnamic acid, furan, furfural, pyran, coumarin, indole, dextrose sucrose, starch, etc. It is to be understood that the aforementioned compounds are only representative of the class of compounds which may undergo pyropolymerization and that the present invention is not necessarily limited thereto.

As hereinbefore set forth one method of preparing the semi-conducting pyropolymeric inorganic refractory oxide material is to admix the aforementioned organic compounds with a carrier gas such as nitrogen or hydrogen, heated and passed over the refractory oxide base. The deposition of the pyropolymer on the surface of the base is effected at relatively high temperatures ranging from about 400° to about 800° C. and preferably in a range of from about 600° to about 750° C. It is possible to govern the electrical properties of the semi-conducting pyropolymeric inorganic refractory oxide material by regulating the temperature and the residence time during which the refractory oxide base is subjected to the treatment with the organic pyrolyzable substance. The thus prepared semi-conducting pyropolymeric inorganic refractory oxide material when recovered will possess a resistivity in the range of from about $10^0$ to about $10^8$ ohm-centimeters. However, if so desired, the semi-conducting pyropolymeric inorganic refractory oxide material may also be subjected to additional exposure to elevated temperatures ranging from about 500° to about 1200° C. in an inert atmosphere and in the absence of additional pyrolyzable materials for various periods of time, said treatment resulting in the reduction of the electrical resistivity of the lowest resistivity powders by as much as 6 orders of magnitude. While the above material describes one method of preparing the semi-conducting pyropolymeric inorganic refractory oxide material, it is to be understood that we do not wish to be limited to this method of preparing said material and that another method may be employed in which the refractory oxide material of the type hereinbefore set forth in greater detail is impregnated with an aqueous solution of a carbohydrate material such as dextrose, sucrose, starch, etc., the impregnated inorganic refractory oxide material is thereafter dried and then pyrolyzed at a temperature ranging from about 700° to about 1200° C. whereby the carbohydrate material is pyrolyzed to form a mono-layer of the carbonaceous material on the surface of the refractory inorganic oxide material. As in the method hereinbefore set forth the resulting semi-conducting pyropolymeric inorganic refractory oxide material may then be subjected to a second heating step at temperatures within the range hereinbefore set forth whereby the resistivity of the material may be altered to reach a predetermined level.

The semi-conducting pyropolymeric inorganic refractory oxide material which is prepared according to the process hereinbefore set forth in the preceding paragraphs and which will possess a resistivity in the range of from about 0.001 to about $10^{10}$ ohm-centimeters may be admixed with virtually any polymeric material which is thereafter utilized to form the surface coating of a polymeric substance or a laminate. Some specific examples of these polymers which may be both thermosetting or thermoplastic by nature will include polyolefins such as polyethylene and polyethylene copolymers, polypropylene and polypropylene copolymers, polystyrene and copolymers, polyvinylacetate, polyvinyl chloride, vinylacetate-vinyl chloride copolymers, polyvinylidene chloride and copolymers, etc., polyesters, polyurethane, polyphenyl ethers, styrenated polyphenyl ethers, polycarbonates, polyamides, polyimides, polyoxymethylenes, polyalkylene oxides such as polyethylene oxide, polyacrylates, polymethacrylates and their copolymers with styrene, butadiene, acrylonitrile, etc., epoxy resins, acrylonitrile-butadienestyrene formulations (commonly known as ABS), polybutylene and acrylic-ester-modified-styrene-acrylonitrile (ASA), alkyd resins, allyl resins, amino resins, phenolic resins, urea resins, melamine resins, cellulose acetate, cellulose acetate butyrate, cellulose nitrate, cellulose propionate, cellulose triacetate, chlorinated polyethers, chlorinated polyethylene, ethyl cellulose, furan resins, synthetic fibers such as the Nylons, Dacrons, Rayons, terylenes, etc. In addition other matrices which may be used as a host for the semi-conducting pyropolymeric inorganic refractory oxide material filler may comprise laminates which are formed by treating a reinforcing material such as canvas, asbestos, glass cloth, cardboard, paper, etc. with a monomer or polymer containing the semi-conducting pyropolymeric inorganic refractory oxide material fillers and thereafter forming the desired laminate by conventional means. For example, canvas may be impregnated with such a thermosetting phenolic resin and the resulting composition of matter heated for a predetermined period at an elevated temperature of about 250° to 350° C. to form the desired product. Likewise, asbestos may be treated with vinyl chloride and vinyl acetate dissolved in a solvent which is thereafter allowed to evaporate thus forming the laminate. It is also possible to treat a reinforcing material such as canvas with a mixture of self-catalyzing epoxy resins and allow the resins to set up at room temperature. It is to be understood that the aforementioned polymeric materials are only representative of the class of compounds which may be composited with the semi-conducting pyropolymeric inorganic refractory oxide material to form the novel compositions of matter of the present invention, and that said present invention is not necessarily limited thereto.

The aforementioned semi-conducting pyropolymeric inorganic refractory oxide materials which possess the desired resistance may be comminuted by milling the material to form particles which possess the desired size, that is, less than 100 microns in size and preferably to form particles less than 10 microns. These particle sizes can be obtained by wet milling the filler material in a volatile solvent medium by means of a roll mill, colloidal mill or ball mill and thereafter flashing off or evaporating the solvent to obtain the dried powder. Examples of suitable solvents which may be employed in the wet milling process will include alcohols, ethers and ketones, etc. such as methyl alcohol, ethyl alcohol, n-propyl alcohol, isopropyl alcohol, acetone, methyl isobutyl ketone, methyl ether, ethyl ether, etc., the evaporation of flashing off step being effected at temperatures ranging up to about 100° C. or more. Following this, the powdered material in the necessary particle size may be admixed with the polymeric material of the type hereinbefore set forth, again in any suitable manner, the semi-conducting pyropolymeric inorganic refractory oxide material usually being present in an amount in the range of from about 10 % to about 50% by weight of the polymeric material which is to be used as the surface coating. One such type of mixing which will permit thorough and uniform distribution of the semi-conducting pyropolymeric inorganic refractory oxide material throughout the polymer is to admix said material with the polymer in a roll mill, said process being especially effective when the polymer is also in dry form. Following this a solvent of the type hereinbefore set forth may also be added and the resulting mixture stirred until a uniform consistency has been reached. It is also contemplated within the scope of this invention that a mixture of a solution of the particular polymer and the semi-conducting pyropolymeric refractory oxide material may be further milled to adjust the particle size of said semi-conducting pyropolymeric inorganic refractory oxide material. Thereafter the mixture may then be utilized for the final purpose in any manner known in the art. for example, one method of utilizing the mixture of the semi-conducting pyropolymeric inorganic refractory oxide material and the polymer is to add the mixture in a final laminate curing step. In manufacturing certain laminates the practice is to use a surface layer in the final curing step, said surface layer being known in the trade as a "butter coat". The butter coat may be prepared by coating a film of a different material than the polymer which is used in the laminate with the mixture of the polymer and the semi-conducting pyropolymeric inorganic refractory oxide material. The mixture of the polymer and the semi-conducting pyropolymeric inorganic refractory oxide material is then subjected to a B-stage cure. Following this in the final laminate curing step the butter coat is attached to the laminate surface, the laminate is then subjected to the final curing step by means of temperature and pressure and thereafter the film of dissimilar polymer may act as a release agent to free the laminate from the press, the surface coating or butter coat being in firm adhesion and becoming a part of the laminate which acts as a core material for the final article. The polymeric film which acts as the carrier for the mixture of polymer and semi-conducting material may, in the preferred embodiment, comprise such polymers known in the trade as Tedlar which is a polyvinylfluoride film, although other polymeric films of similar nature may also be used. It is to be understood that the aforementioned process only discloses one method of preparing the final product and that when other thermosetting or thermoplastic polymers are used the procedure for obtaining a composition of matter comprising a polymeric core and a surface coating containing a semi-conducting pyro-polymeric inorganic refractory oxide material may be prepared by any means well known in the art. In addition, while the aforementioned material has been directed toward the use of a semi-conducting pyropolymeric inorganic refractory oxide material to impart desirable physical characteristics to the surface coating of a composition of matter, it is also contemplated that other materials may be used as fillers for the surface coating, said filler materials including colored pigments, fluorescent dyes, etc. whereby other characteristics may be imparted to the finished material.

The following examples are given to illustrate novel compositions of matter of the present process, however, said examples are not intended to limit the generally broad scope in strict accordance therewith.

EXAMPLE I

In this example a glass cloth in impregnated with an epoxy resin by treating woven glass cloth with a mixture consisting of approximately 60 parts epoxy polymer formed by the reaction of bisphenol-A with epichlorhydrin, about 20 parts of the solvent such as dimethylformamide, about 20 parts of another solvent comprising methyl cellosolve along with about 2 parts of a curing agent comprising dicyandiamide and about 0.25 parts of a catalyst comprising benzyl dimethylamine. The impregnated cloth is passed through an oven which is maintained at a temperature of about 160° C. to effect a B-stage cure.

The surface coating which is to be applied to the epoxy-glass resin is prepared by placing a small amount of the epoxy mixture containing the solvent, curing agent and catalyst in a second container and admixing the resin with acetone. To this mixture is added 10 to 50% by weight of a semi-conducting pyropolymeric inorganic refractory oxide material which has been prepared by pyrolyzing gamma-alumina which was previously impregnated with a dextrose solution at a temperature of about 710° C. for a period of about 1.5 hours, the resulting semi-conducting pyropolymeric inorganic refractory oxide material possessing a bulk resistivity value of 1500 ohm-centimeters. The thus prepared material is milled with acetone until a maximum particle size of 10 microns is obtained and thoroughly admixed with the epoxy resin mixture for a period of about ½ hour. The thus prepared resin mixture is used to coat a polyvinylfluoride film known in the trade as Tedlar and subjected to a cure at a temperature of 160° C. for a period of about 5 minutes until a B-stage cure is effected. The butter coat surface coating thus prepared is then pressed on the epoxy-glass resin prepared according to the above paragraph and subjected to pressure in a pressure apparatus of about 750 pounds per square inch while heating the apparatus to a temperature of about 175° C. for a period of 1 hour. At the end of this time, the epoxy-glass resin is removed from the press and the Tedlar is removed from the laminate, said Tedlar acting as a release agent between the caul plate and the laminate. The resulting composition of matter will contain an epoxy-glass resin as the core material while the surface coating will comprise an epoxy resin containing the electrically conductive semi-conducting pyropolymeric inorganic refractory oxide material.

EXAMPLE II

A thermosetting phenolic resin is partially cured by heat to form a B-stage resin.

A semi-conducting pyropolymeric inorganic refractory oxide material is prepared by pyrolyzing a gamma-alumina in a benzene and nitrogen environment at a temperature of 750° C. for a period of 1 hour followed by additional heat treatment in a nitrogen atmosphere at a temperature of 930° C. for an additional 0.5 hours. The thus prepared semi-conducting pyropolymeric inorganic refractory oxide material is wet milled in an isopropyl alcohol medium until a particle size of less than 10 microns is reached and thereafter the material is dried. A mixture of uncured phenolic resin, solvent, catalyst and 50% by weight of the resin of the aforementioned semi-conducting pyropolymeric inorganic refractory oxide material is thoroughly admixed by blending and coated on a Tedlar film. Thereafter the film is then cured at a temperature of 180°–320° F. for a period of 5 minutes until the B-stage of the cure is reached.

Following this the butter coat and the phenolic resin core are placed in a press which is thereafter heated to a temperature of about 175° C. under a pressure of about 1,000 pounds per square inch for a period of 1 hour. At the end of this time, heating is discontinued and the laminate is removed from the press. The Tedlar film is peeled off thus leaving a composition of matter which possesses a phenolic resin core and a surface coating of phenolic resin containing the semi-conducting pyropolymeric inorganic refractory oxide material.

EXAMPLE III

In this example a polymeric core is prepared by utilizing a polyimide resin impregnated paper which is placed in a mold and heated to a temperature of 163° C.

A semi-conducting pyropolymeric inorganic refractory oxide material is prepared by treating gamma-alumina in a cylohexane and nitrogen environment for a period of 1 hour at a temperature of 700° C. followed by an additional treatment in a nitrogen atmosphere for a period of 0.5 hours at a temperature of 900° C. The thus prepared semi-conducting pyropolymeric inorganic refractory oxide material is wet milled in an isopropyl alcohol medium until a particle size of about 1 micron is reached. The semi-conducting pyropolymeric inorganic refractory oxide material powder is then admixed with an additional amount of melted polyimide resin. The mixture is then coated on a Tedlar film which is pressed on the polyimide resin-paper core and treated at a temperature of about 163° C. for a period of 1 hour. At the end of this time the composition of matter is removed from the press and the Tedlar film is peeled therefrom thus resulting in a composition of matter which comprises a polyimide resin-paper core having a surface coating containing an electrically conductive material.

EXAMPLE IV

A non-air-inhibited polyester resin mixture is prepared and coated on a linen fabric and allowed to cure to a tack-free condition on exposure to air. A semi-conducting pyropolymeric inorganic refractory oxide material is prepared by impregnating gamma-alumina with a dextrose solution at room temperature for a period of 2 hours. The impregnated gamma-alumina is then dried to remove excess moisture and thereafter pyrolyzed in a nitrogen atmosphere at a temperature of 900° C. for a period of 2 hours. Following this the material is further heated at a temperature of 1100° C. for an additional 1 hour, thereafter recovered and wet milled in an isopropyl alcohol medium until a particle size of 10 microns is reached. The powder is then dried and admixed with an additional amount of the polyester resin. After the resin and powder are mixed for a period of 0.5 hours to insure a complete blending, the mixture is coated on a Tedlar film and allowed to air cure until tack-free. The polyester resin-linen core and the butter coated Tedlar film are pressed at a temperature of 150° C. for a period of 1 hour using a pressure of 500 pounds per square inch. At the end of this time the material is removed from the press and the Tedlar film is peeled therefrom thus leaving a composition of matter comprising a polyester resin-linen core possessing a surface coating which contains an electrically conductive material.

EXAMPLE V

In this example a thermoplastic polymer comprising polypropylene is used as the core material. A sheet of polypropylene is placed in an injection mold and formed into the desired shape. Following this, a semi-conducting pyropolymeric inorganic refractory oxide material which is prepared by pyrolyzing gamma-alumina in a benzene and nitrogen environment at a temperature of 750° C. for a period of 1 hour followed by an additional heat treatment in a nitrogen atmosphere at a temperature of 950° C. for 0.5 hours is milled with polypropylene pellets at a temperature of about 260° C. for a period of 10 minutes in a nitrogen atmosphere. When the mixture is homogenous, it is coated on a Tedlar film. Therafter the coated Tedlar film is pressed on the previously molded polypropylene and the resulting composite is laminated at a pressure of 200 pounds per square inch at a temperature of 260° C. for a period of 1 hour. At the end of this time the composite is removed from the press and the Tedlar film is peeled therefrom, thus leaving a composition of matter consisting of a polypropylene core, the surface of which contains an electrically conductive semi-conducting pyropolymeric inorganic refractory oxide material.

We claim as our invention:

1. A polymeric laminate, the surface lamina of which comprises a polymer containing a particulate semiconducting material comprising an inorganic refractory oxide having a surface area of from about 1 to about 500 square meters per gram and a carbonaceous pyropolymer forming at least a monolayer on said refractory oxide, said semiconducting material possessing a resistivity of from about 0.001 ohm centimeters to about $10^{10}$ ohm centimeters, said particles of semiconducting material being less than 100 microns in size and being present in said surface lamina in an amount of from about 10% to about 50% by weight of said surface lamina.

2. The composition of matter as set forth in claim 1 in which said polymeric core is an epoxy resin.

3. The composition of matter as set forth in claim 1 in which said polymeric core is a phenolic resin.

4. The composition of matter as set forth in claim 1 in which said polymeric core is a polyimide resin.

5. The composition of matter as set forth in claim 1 in which said polymeric core is a polyester resin.

6. The composition of matter as set forth in claim 1 in which said polymeric core is polypropylene.

* * * * *